United States Patent [19]

Daume et al.

[11] Patent Number: 5,727,585
[45] Date of Patent: Mar. 17, 1998

[54] DEVICE FOR OBTAINING ENERGY FROM SUNLIGHT WITH AT LEAST ONE SOLAR COLLECTOR

[76] Inventors: Jochen Daume, Argonner Weg 29, 42659, Solingen; Heinrich Bauer, Kohlkopfstr. 14, 67661, Kaiserslautern; Arnold Grimm, Krautgarten 12, 36124, Eichenzell, all of Germany

[21] Appl. No.: 765,300
[22] PCT Filed: Jun. 24, 1995
[86] PCT No.: PCT/EP95/02465
 § 371 Date: Mar. 17, 1997
 § 102(e) Date: Mar. 17, 1997
[87] PCT Pub. No.: WO96/00871
 PCT Pub. Date: Jan. 11, 1996

[30] Foreign Application Priority Data

Jun. 29, 1994 [DE] Germany .............. 44 22 755.8

[51] Int. Cl.[6] .......................................... F16K 3/36
[52] U.S. Cl. .................. 136/246; 126/653; 126/657; 126/699
[58] Field of Search ........................ 126/652–657, 126/699; 136/246, 248

[56] References Cited

U.S. PATENT DOCUMENTS

| 4,892,593 | 1/1990 | Lew | 136/246 |
| 5,577,492 | 11/1996 | Parkyn et al. | 126/699 |

Primary Examiner—Carroll B. Dority
Attorney, Agent, or Firm—Harness, Dickey & Pierce, P.L.C.

[57] ABSTRACT

The present invention relates to a device for obtaining heat and/or electrical energy from sunlight with at least one solar collector (2) having an absorber (4) and an energy concentrator (6) surrounding the absorber over its length and at least regions of its periphery and optically concentrating the sunlight on the absorber (4). The energy concentrator (6) has a prism arrangement (12) of transparent material at least at its peripheral region which will be illuminated by the sunlight in accordance with the sun's daily movements, with a plurality of axial adjacent prisms (14) running parallel to the absorber (4) and distributed around the periphery. All the prisms (14) are equal sided in cross section and their apexes (18) are directed towards the absorber (4).

29 Claims, 8 Drawing Sheets

DEVICE FOR OBTAINING ENERGY FROM SUNLIGHT WITH AT LEAST ONE SOLAR COLLECTOR

The present invention concerns a device for obtaining thermal and/or electric energy from sunlight with at least one solar collector exhibiting an elongated absorber that features along its entire length and circumferentially enclosing—at least sectionally—an energy concentrator that focuses the sunlight optically upon the absorber.

Solar collectors with optical energy concentration are known. The conventional versions rest either on the principle of a Fresnel lens (see, e.g., the publications U.S. Pat. No. 4,022,186, U.S. Pat. No. 4,069,812 and U.S. Pat. No. 4,337,759), a converging lens, or a diverging lens. Collectors built on the principle of the Fresnel or the converging lens achieve, however, a concentration factor of max. 1:1.3 to 1:1.5. This concentration factor can only be enhanced by mechanically causing the collector to follow the movement of the sun, as it is also outlined in the publications mentioned above. However, this is extremely elaborate from a construction point of view. In addition, the disadvantage of the Fresnel-lens systems lies in the fact that all individual roughly triangular-shaped step lenses must be calculated and shaped differently in order to achieve the desired point or line focus. Although diverging lenses achieve a slightly higher concentration factor of approximately 1:1.9, this collector type has the great disadvantage of a very difficult and costly production. Its lenses, built up in axial tube direction, show a smallest thickness of approximately 3 mm but a largest thickness of 10 mm. This causes material tension during manufacturing by extrusion because of various degrees of cooling of the transparent material. These material tensions can only be controlled with difficulty and lead to an above average high production cost.

The present invention is based on the task to create a device of this category in an especially economic manner that will achieve a higher concentration factor and thus improved efficiency.

According to the invention this is achieved by the fact that the energy concentrator shows, at least in a circumferential area, a prism structure consisting of a transparent material exposed to sunlight according to the daily course of the sun; these prisms with a multiplicity of axially and parallel to the absorber arranged prisms are placed side by side on the periphery where all prisms have an isosceles and identical cross-section with their tips pointing to the absorber. It is especially advantageous if the prisms have convex outer surfaces on the sides exposed to the sunlight. Thus, "convex-prismatic" lenses are practically formed.

The prism structure according to the invention can be extremely easily and inexpensively manufactured by either using transparent originally and essentially plane film and foil material showing the prisms on one side and a plane surface on the other. This material, then, only needs to be formed into a tubular or at least partially tubular (e.g. half tube) shape. The special very simple geometry of the prisms according to the invention has the added advantage that an energy concentrator can be manufactured as a plastic extrusion part, which would be very economical.

The invention allows optimal utilization of the sunlight along the course of the sun over more than 160°, i.e., it is almost entirely concentrated onto the absorber. This can be advantageously achieved without the solar collector having to follow the course of the sun mechanically; the invention represents much more an optical single-axis following of the course of the sun onto the absorber. Surprisingly, it has been shown that even without mechanical following a significant concentration factor of more than 1:2.5 can be achieved. In this regard, the invention is based on the recognition that with the well-known Fresnel-lens system—because of the inherent point or line focusing which must be exactly calculated—the focusing without mechanical following would very quickly "walk completely away" from the range of the absorber because of the movement of the sun. Because of the special isosceles geometry of the prisms, the prism structure according to the invention—where preferably all prisms are identically shaped in regard to their cross-section—intentionally causes a surface focusing so that, advantageously, during the course of the sun the focusing area is at least partially in an area that covers the range of the absorber. This means that through a deliberate "residual scattering" the rays are concentrated upon a surface area, which during the movement of the sun shifts only slightly in relationship to the absorber. This has the advantage that a mechanical following of the system is obsolete. In addition, because of the design of the prism structure according to the invention reverse or total reflection are almost completely avoided. This leads to a negligibly small energy loss.

Additional advantageous design features of the invention and special operational versions are contained in the sub-claims as well as in the following description of preferred operational version and application examples.

With the help of the drawing the invention shall now be explained in more detail by way of example. Shown are.

In the different illustrations of the drawing, same pads have always been marked with the same reference symbols. Thus, each description referring to a drawing illustration occurs only once but applies to the parts with the same reference symbol in other drawing illustrations and can thus be identified.

Figure 1:
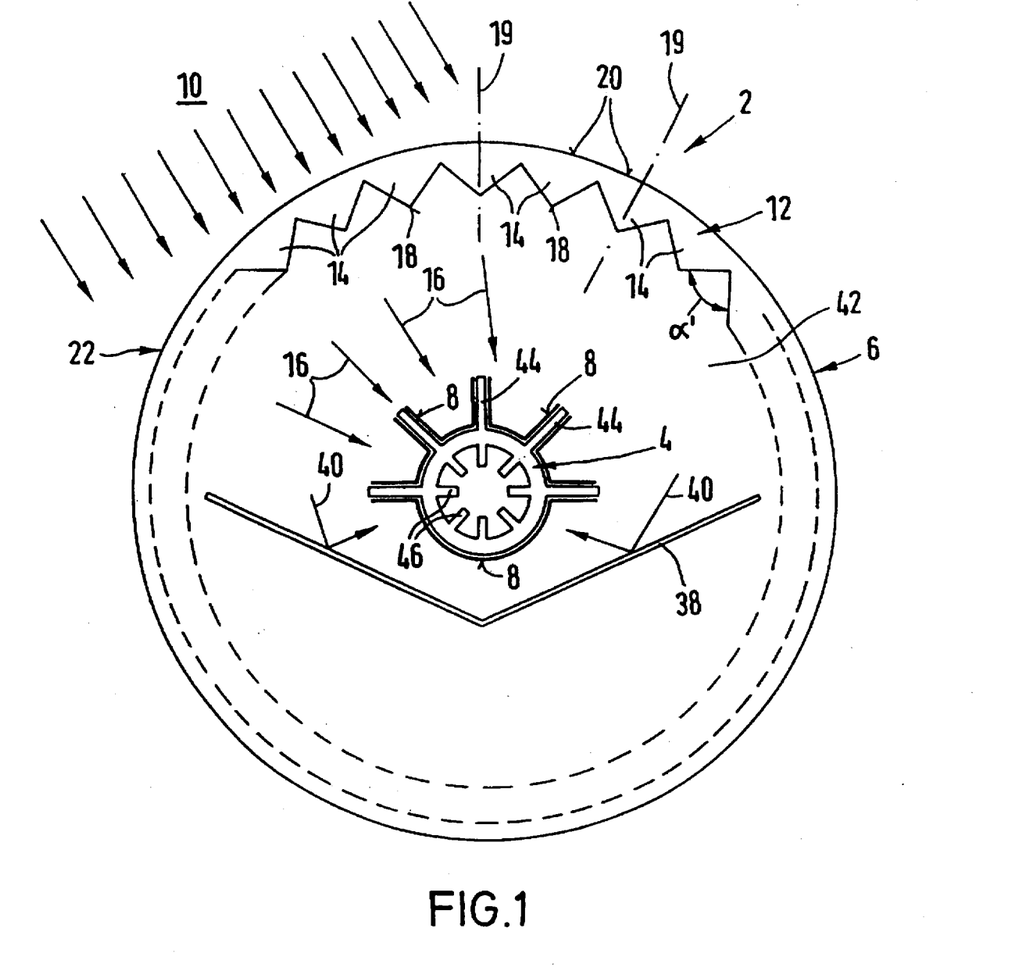
FIG. 1 in a schematic front view the composition of the solar collector according to the invention in an original operational version, FIG. 2 an alternative design of the energy concentrator in an illustration analogous to FIG. 1, FIG. 3 a plan view of the energy concentrator similar to FIG. 2, however, showing an additional design variation, FIG. 4 a primarily schematic composition of the prism structure or a film or foil material used for the manufacturing of the prism structure, respectively, FIG. 4a a section of the prism structure for the demonstration of the course of the rays or of the concentration effect, respectively, FIG. 5 a partial axial sectional view in a concluding area of the solar collector with illustration of a part of the mounting element, FIG. 6 a perspective view of the solar collector with two mounting elements at the end, FIGS. 7 through 9 one schematic illustration, each, of possible linking of several solar collectors according to the invention, FIG. 10 an additional especially advantageous operational version of the energy concentrator according to the invention in a view analogous to FIGS. 1 through 3, FIG. 11 an enlarged illustration of the area XI in FIG. 10 and FIG. 12 a primarily schematic, i.e., not to scale, demonstration of the principle of the energy concentrator according FIG. 10 for the explanation of the geometry.

As can first be concluded from FIG. 1, a solar collector 2 according to the invention features an elongated absorber 4, preferably made of aluminum, and an energy concentrator 6 extending over its entire length and at least sectionally enclosing the absorber 4 circumferentially thus concentrating the sunlight optically upon the absorber 4, i.e., deflecting it. To obtain thermal energy, the absorber 4 is of tubular shape so that an appropriate especially metal-enriched heat transport medium can flow through it. The absorber 4 transfers the energy radiated upon it in the form of heat to the heat transport medium. The heat transport medium is preferably enriched with very small copper particles but in such a way that an electrically conductive bridge to the absorber 4, consisting of aluminum, is avoided. This measure results especially in more effective corrosion protection.

In addition, or else as an alternative, the absorber 4 can feature photovoltaic elements 8 on the outside for the generation of electric or photovoltaic energy. These are specially formed as external surface coating made of a corresponding semiconductor material (e.g. AlGaAS).

According to the invention, the energy concentrator 6 now features a prism structure 12 of a transparent ("crystal-clear") material distributed at least over a circumferential area that is exposed to the sunlight in relationship to the daily course of the sun. This prism structure 12 according to the invention shows at least one circumferential area with (tubular) axial and parallel to the absorber 4 arranged prisms 14 placed side by side. These prisms 14 cause a deflection of the sunlight 10 in such a way that the latter is concentrated onto the absorber 4. This is shown in FIG. 1 by means of arrows 16. Thus, the prisms 14 function as so-called deflecting prisms where, according to the invention, all prisms are shaped isosceles and preferably also identical. Therefore, all prism angles and all angles between adjacent prism surfaces are preferably of the same size. According to the invention, the prisms 14 with their tips or "diffracting edges" 18 are arranged pointing to the absorber 4 where the axis 19 running through the tips 18 and dividing the prism angle in half run essentially radially to the central axis of the solar collector 2. In addition, it is advantageous for the benefit of an especially high concentration factor when the prisms 14—viewed in their cross-section—feature convex curved outer surfaces 20 on the sides exposed to the sunlight 10. Thus "convex-prismatic" lenses are formed. From a viewpoint of manufacturing technology it is especially advantageous when the convex outer surfaces 20 of the prisms 14 are formed by a continuously convex and, in its cross-section, circular arc-shaped outer surface 22 of the energy concentrator 6.

Preferably, the energy concentrator 6 is shaped in tubular form enclosing the absorber 4 co-axially. In this case, according to FIG. 1 the prism structure 12 either essentially spans the entire circumference of the energy concentrator 6 or, according to FIGS. 2 and 3 only an approximately partial half-tube-shaped 180° degree segment of the tube circumference of the energy concentrator 6. According to FIG. 2, the remaining section of the tube circumference of the energy concentrator 6 that is free of prisms forms one piece together with the prism structure 12 of the tubular shell (hollow cylindrical section) 24. In the operational version according to FIG. 3 the prism structure 12 only forms a semi-tube where the prism structure 12 is complemented by a housing part not shown to form the full tube. This housing part that is not shown is then linked with appropriate components—also not shown—to the prism structure 12 in such a fashion, that a tight joint is assured between the parts in the area of the lateral concluding edges 26 of the semi-tubular prism structure 12. The purpose of this measure will be explained below.

Figure 4:
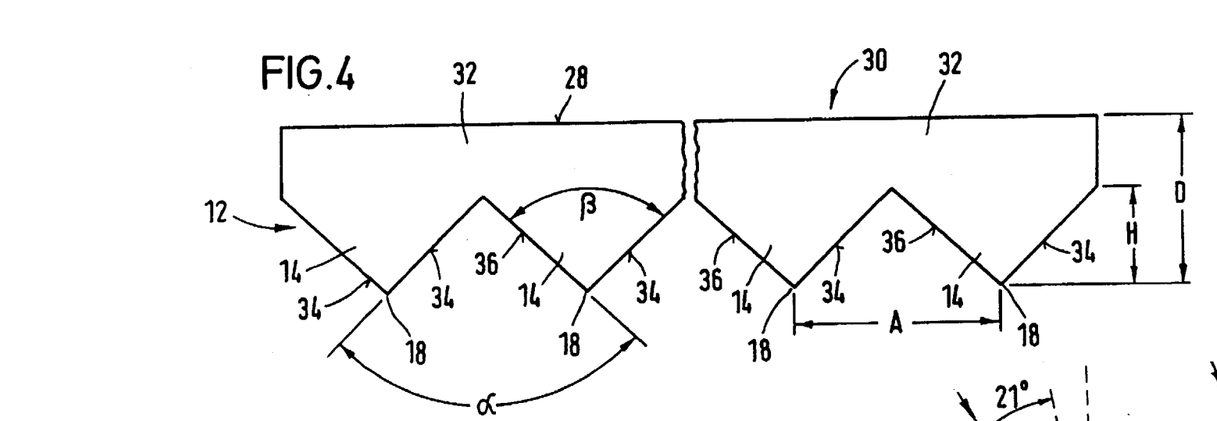

As can be concluded from FIG. 4, the prism structure 12 can be advantageously formed from a flexible originally and essentially plane film or foil material 30, i.e., featuring a plane surface 28 on the one side and the prisms 14 on the other. This material 30 must then simply be formed to produce arc or cylinder shape causing the plane surface 28 to form a convex or arc-shaped outer surface 22 and the prism structure 12 (compare FIG. 4 with FIG. 4a and FIG. 1). Thus a hollow circumferentially closed cylinder is produced according to FIG. 1 from the material 30 where the long lateral edges are tightly joined preferably through adhesive bonding or welding.

Figure 2:
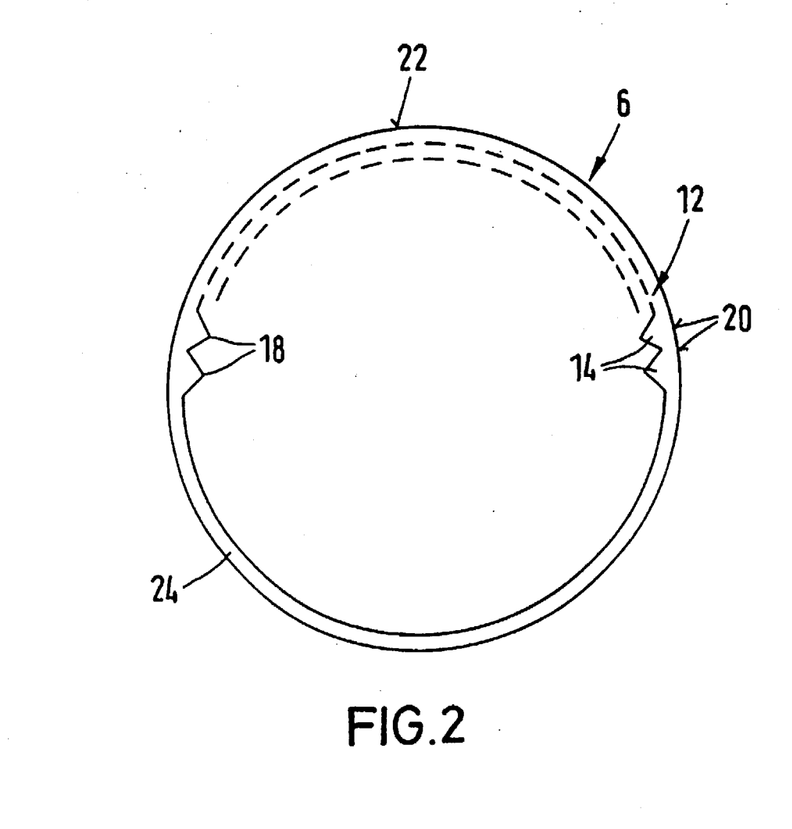
Figure 3:
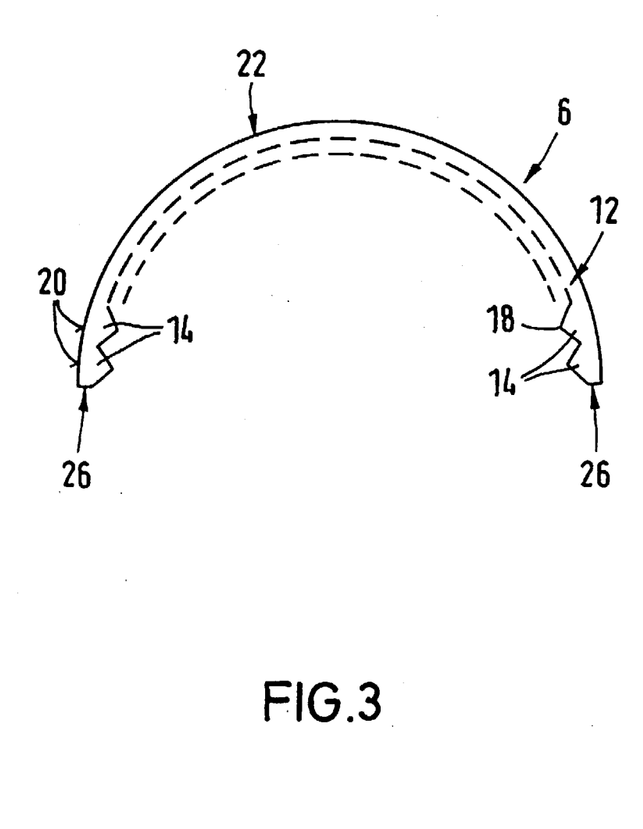

As can further be concluded from FIG. 4, the material 30 used for the prism structure 12 according to the operational version shown in FIGS. 1 through 3 shows a thickness D—measured from the outer surface 28 to the tips or "diffracting edges" 18—of at least 0.5 mm. To achieve a better mechanical stability, the thickness D lies preferably in the range of 1.5 to 2 mm. The prisms 14—originating from a joint basis 32—show a height H of approximately 0.15 to 0.2 min. In its "flat" state of the material 30 according to FIG. 4 the adjoining prisms 14 have a lateral center line distance A to each other (distance of the tips 18) in the range of 0.3 to 0.5 mm. In addition, the adjoining prism surfaces 34, 36 of two adjoining prisms 14 include an angle $\alpha$ lying in the range of 96° in the flat condition according to FIG. 4. When the material 30 is then brought into the preferred arc or hollow cylindrical shell form of the energy concentrator 6, the angle $\alpha^1$ (FIG. 4a) reduces itself down to approximately 60° to 80° or, particularly, 70° average. Thus the angle $\alpha^1$ in this particular operational version is smaller/equal 90°. Through this forming of the material 30 the distance A mentioned above between the prism tips 18 reduces itself correspondingly. With this operational version, the prism angle $\beta$ is approximately 90°.

Figure 4A:
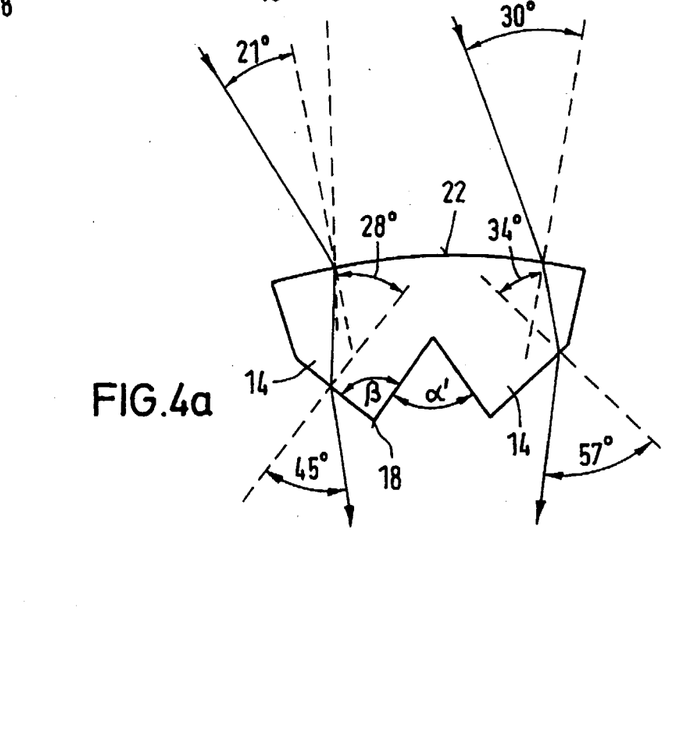

FIG. 4a shows the example of two ray or optical paths demonstrating that the light is concentrated towards the inside onto the absorber. The entire solar collector 2 preferably shows a length of 1 m and an outer diameter of approximately 150 mm.

According to FIG. 1, the preferred layout intends to install a reflector 38 below the absorber 4 on the side facing away from the sunlight 10 or the prism structure 12, respectively. This reflector 38 stretches axially and parallel to the absorber 4 through the tubular-shaped energy concentrator 6. The reflector 38, as shown, can either show an angular or parabolic cross-section. The reflector 38 has been designed with a very high degree of reflection of approximately 95% which can be achieved through a mirror finish. The reflector 38 serves the reflection of those sun rays that initially bypass the absorber 4 so that after the reflection through the reflector 38 these rays will hit the absorber after all. This has been shown in FIG. 1 with arrows 40. In addition, the reflector 38 advantageously causes a reflection of the heat radiation originating at the absorber 4 back onto the same.

It is advantageous for the efficiency of the solar collector 2 when the space 42 between the absorber 4 and the optical energy concentrator 6 is or can be evacuated. For this reason—as already indicated above—the tubular-shaped energy concentrator 6 should be circumferentially tight (gas and moisture tight). For the evacuation of the space 42 a vacuum pump (not shown) is employed that should, at least partially, preferably be powered by the electrical energy obtained through the photovoltaic elements 8. This preferred type of evacuation has the distinct advantage that the vacuum can practically be maintained over the entire life cycle of the solar collector 2. The evacuation takes practically only place during sun exposure, which is especially economical, because an evacuation only makes sense during that time. This means that during the night an evacuation is not necessary.

As can further be concluded from FIG. 1, the absorber 4 preferably shows outer fins 44 to enlarge its energy absorbing surface which "catches" also those sun rays that do not exactly hit the center or the outer jacket of the tubular-shaped absorber 4. Preferably, these outer fins 44 carry the photovoltaic elements 8. The absorber 4 thus also serves as support beam construction with good statics properties. In addition, it is advantageous when the tubular-shaped absorber 4 also shows inner fins 46 for the enlargement of its energy transferred from the inner surface to the heat transport medium. The improved thermal energy transfer to the heat transport medium is achieved by increasing the "Reynolds number" and the "Nusselt number".

Alternatively (or also additionally) to the inside fins 46, the use of a heat exchange pipe for the absorber 4 can be employed at a special advantage. Its pipe wall has a relief-type structure achieved through the "denting process" and described, e.g., in DE-A-25 57 215. This structure features honeycomb-like (e.g., square or hexagonal), corrugated zones extending into the inner cross-section of the tube. Practically, this takes place beginning at the inside of the pipe through vacuum application of the pipe wall were the latter is "sucked" in segments towards to inside. However, the structure can also be formed from the outside, e.g., mechanically.

This measure of "zonal corrugation" has considerable advantages. It has been proven, for instance, that through structuring of the inner wall a significant improvement of the heat transfer between the pipe and the flowing heat medium can be achieved. It has further been ascertained that this is due to an increased tendency of the medium toward turbulent flow and, consequently, already at very low pump performance a good turbulence of the heat medium can be achieved even before the actual Reynolds number has been reached. In addition, a rather high mechanical stability can be reached at a small wall thickness allowing the absorber to have a very thin wall, possibly even half or one third of the conventionally necessary wall thickness. This results in reduced material cost. With this operational version, preferably the ends of the absorber are molded together facilitating mechanical mounting and providing a medium-tight connection, which is an advantage because of the structured, "uneven" surface.

The structured ("dented") heat exchange pipe described above can also be used advantageously and regardless of the solar collector invention for heating and cooling purposes of a general kind.

As can be concluded from FIGS. 5 through 9, the solar collector 2 features a mounting element 50 on both ends. These mounting elements 50 hold the inner absorber 4 and the outer energy concentrator 6 in place—and, if required, also the reflector 38. In addition, the mounting elements 50 also aid the installation of the solar collector 2 especially in the area of a building's roof. In the operational version shown each mounting element 50 is intended to tightly enclose the end of the tubular energy concentrator 6 in particular with a ring-shaped elastic profile sealing element 52 and/or through pouring. The seal thus achieved serves the purpose of performing an evacuation of the space 42 as described above. In addition, the sealing elements 52 have the task to absorb heat expansion of the solar collector 2 or to compensate for it as it occurs and thus to avoid material tensions.

Figure 5:
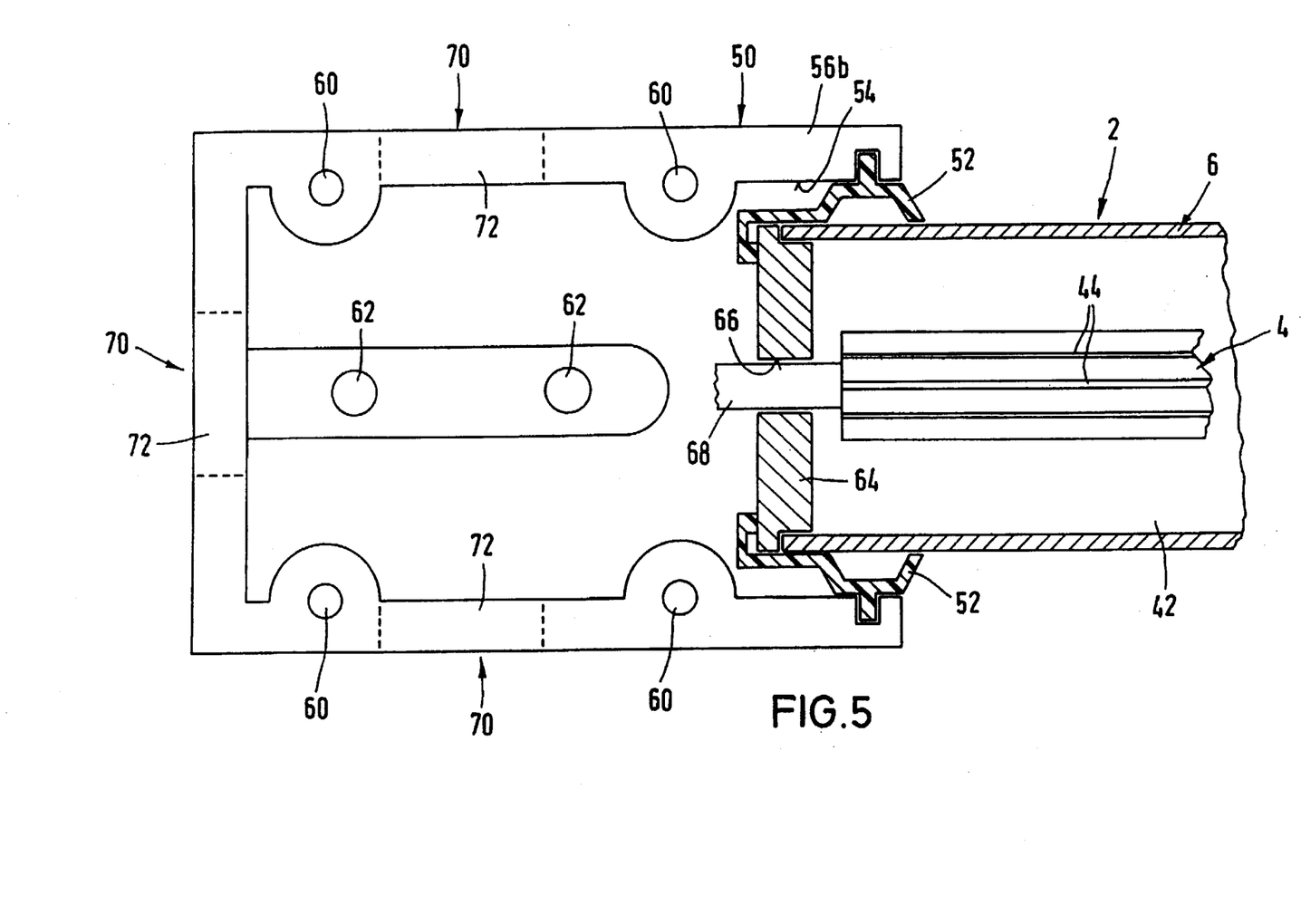
Figure 6:
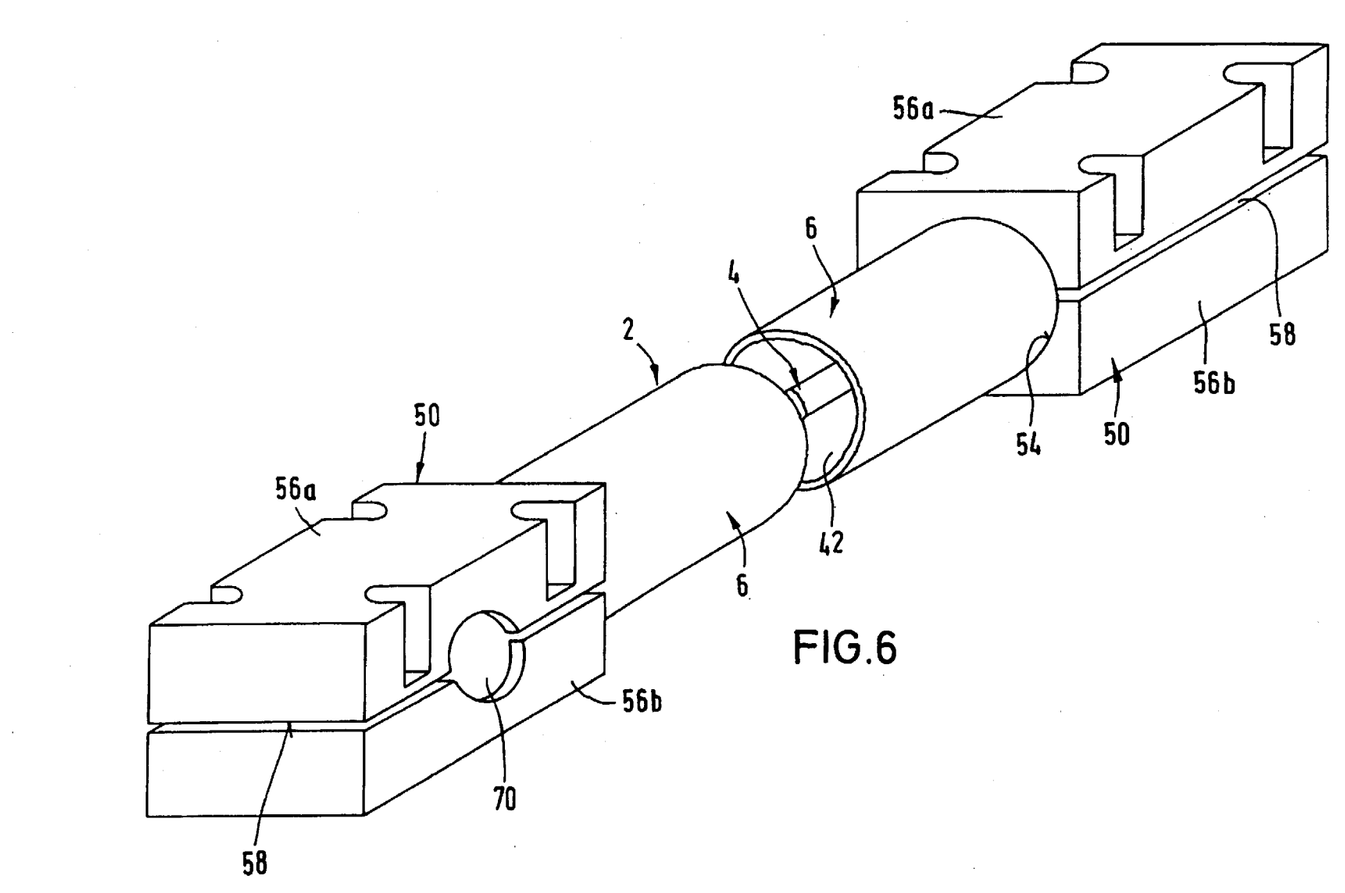

According to FIGS. 5 and 6, each mounting element 50 contains at least one opening 54 towards the housing to accommodate one end of the solar collector 2; this opening 54 holds the seal element 52. The housing-type mounting element 50 consists suitably of two housing halves 56a and 56b with a division plane 58 determined by the center axis of the solar collector 2 (FIG. 6). The housing halves 56a, b can be firmly joined together (tightened) incorporating the end of the solar collector; preferably, removable screw connections are used. The lower housing half 56b (see FIG. 5) shows blind holes 60 into which preferably self-threading screws—not shown—can be screwed after entering through the through-holes of the upper housing half 56a. In addition, at least one housing half 56b features mounting holes 62 for the installation of the mounting element 50 onto a roof mounting piece—not shown—by means of respective screws.

According to FIG. 5 each end of the tubular energy concentrator 6 is closed with a plate or plug-shaped guide element 64 where the sealing element 52 also closes the circular gap between the energy concentrator 6 and the guide element 64. Each guide element 64 features a central opening 66 for the penetration by a terminal pipe section 68 of the absorber 4. This positions the absorber 4 centrically and co-axially within the energy concentrator 6. In addition, each mounting element 50 features at least one connector 70 transitioning into the tubular absorber 4 or into the pipe section 68 for a connecting line 71 (supply or return line) for the heat transport medium. It is advantageous if the housing halves 56a, b feature pre-stamped sections 72 that can be broken away ("breaking piece") to form the above connections 70.

The preferred operational version here described allows for an easy and economic installation. Only the absorber 4 and, if applicable, the reflector 38 are inserted into the tubular energy concentrator 6 and the positioning then takes place through the guide elements 64. The solar collector unit 2 thus formed is then furnished with the mounting elements 50 at both ends. It is advantageous if the guide elements 64 consist of a material with low heat transfer properties thus avoiding heat build-up between the absorber 4 and the mounting elements 50.

Figure 7:
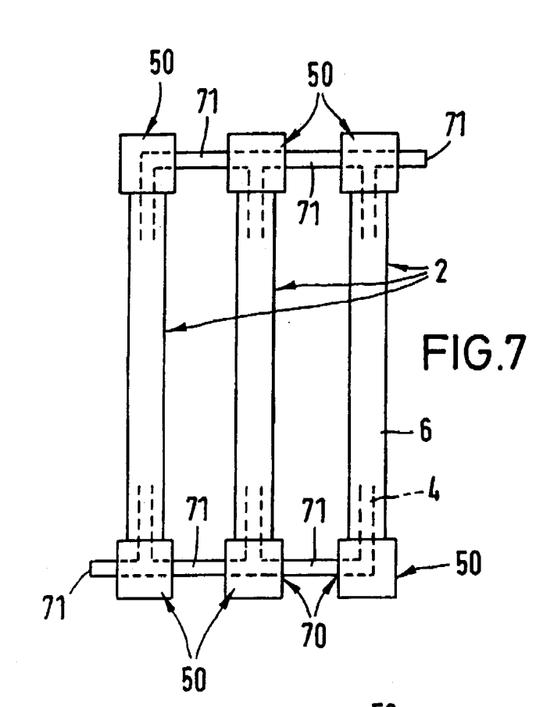
Figure 8:
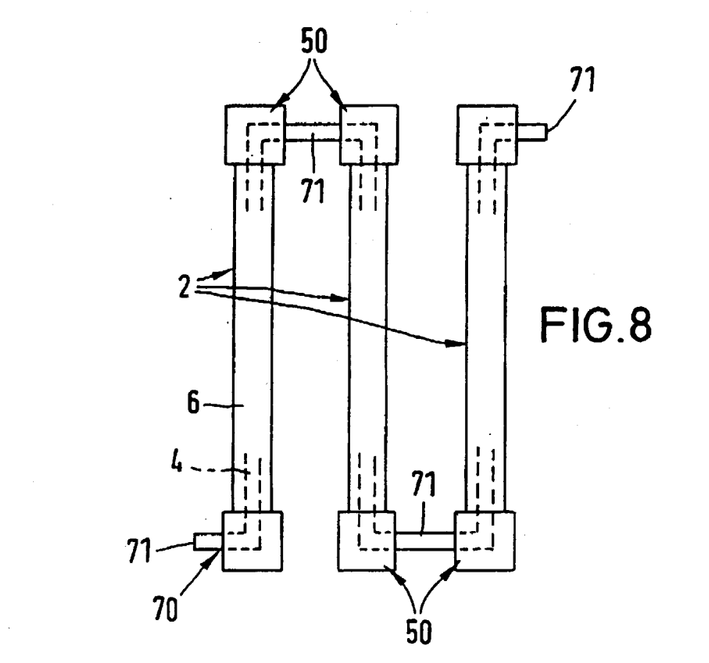
Figure 9:
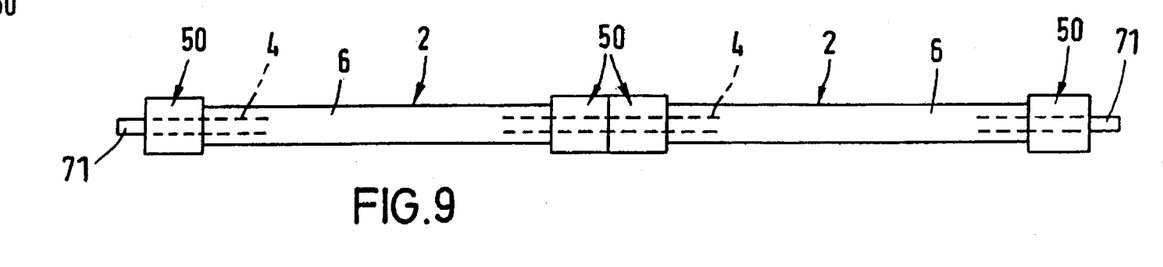

According to FIGS. 7 through 9 several solar collectors 2 according to the invention can be connected together in practically any desired manner. FIG. 7 shows, for instance, a parallel connection. FIG. 8 shows, e.g., shows a sequential connection of several solar collectors 2. In this example according to FIG. 8 the solar collectors 2 have been spatially assigned to each other in a parallel arrangement resulting altogether in a meandering course. FIG. 9 shows yet another kind of sequential connection. Two (or more) solar collectors 2 have been arranged co-axially behind each other. Of course, combinations of connection variations as shown in FIGS. 7 through 9 can be envisioned.

The solar collectors 2 according to the invention can be installed in an extremely simple manner and with very little equipment allowing individual adaptation to the respective installation site, e.g., on differently shaped roofs, rails, eves, parapets etc., a fact also favored by a very low weight. Usually, a crane or similar device is not necessary.

The solar collector according to the invention is a "high-performance collector". At a meteorological mean horizontal sun radiation of approximately 3 kwh/d and a physical area of approximately 1 square meter and with seven collectors 2 a thermal output of 6 kwh/d and, if applicable, additional photovoltaic energy of approximately 1.1 kwh/d can be achieved (measured values).

Another advantageous further development of the invention shall now be outlined. The subject matter is an outer surface coating (not detectable in the drawing) of the energy concentrator 6 at least in the area of the prism structure 12 primarily for the reduction of surface contamination. This surface coating consists preferably of transparent ceramic particles of a size in the range of nanometer dimensions (so called "nano crystals"). This results in a very smooth, contamination-resistant and also mechanically very (scratch-) resistant surface preventing also electrostatic charging. The dirt adhesion is strongly reduced. The coating can either be sprayed and/or rolled on. This advantageous measure helps reduce normal contamination to roughly 5% and this without any limitation on the optical properties of the energy concentrator 6. At the same time, a mechanical surface protection is achieved.

Figure 10:
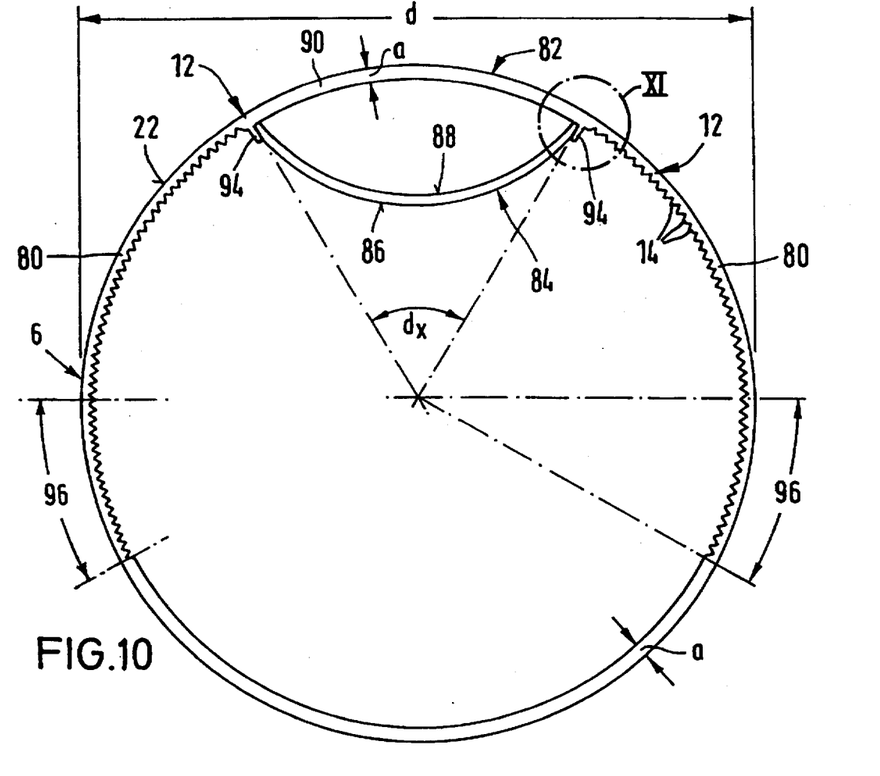
Figure 11:
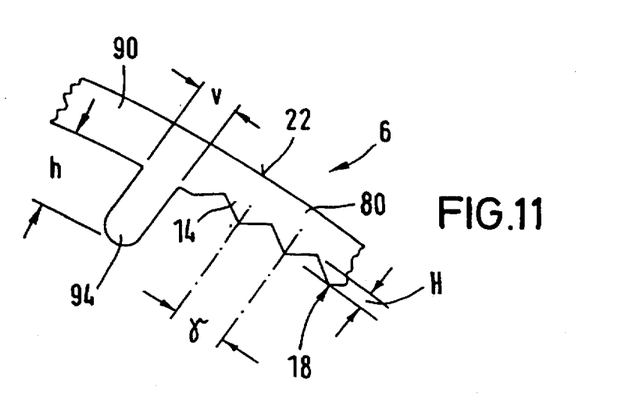
Figure 12:
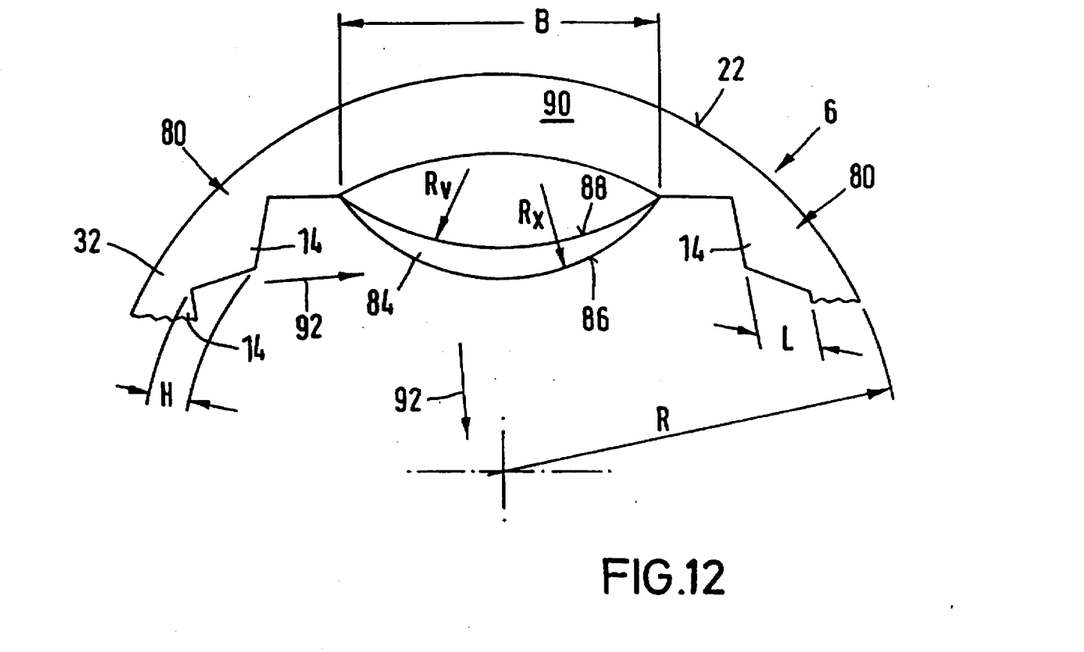

Based on FIGS. 10 through 12, another especially advantageous operational version of the energy concentrator 6 according to the invention shall now be outlined. The prism structure 12 shows a prism-free lens zone 82 symmetrically positioned between two prism zones 80 with a lens element 84 positioned in this area. This lens element 84 is formed as an elongated convex/concave lens extending parallel to the prisms 14 and thus parallel to the longitudinal extension of the energy concentrator 6 where the curvature of the convex/concave lens extends toward the inside into the energy concentrator 6 and thus radially in the direction of the absorber 4. Thus, a convex lens surface 86 faces the absorber 4 and a lens surface 88 lying opposite to the former is facing away from the absorber 4. Preferably, the two prism zones 80 are joined via a connecting section 90 into one piece where the connecting section 80 continues the arc or cylinder wall form. The lens element 84 serves the purpose to re-direct inwardly toward the absorber 4 even those light rays that are actually deflected by the prisms 14 as secants "passing the absorber 4." This is shown in FIG. 12 with arrows 92.

The lens element 84 is preferably manufactured as a separate part, e.g., by extrusion and then joined with the remaining, preferably also extruded, essentially tubular part. To facilitate the above, the tubular part of the energy concentrator 6 preferably features two mounting ribs 94 extending radially toward the inside and running in a longitudinal direction where the lens element 84 is held between these ribs either non-positively or/and positively by pushing it axially between the mounting ribs 94 or by inserting it radially by elastically bending it.

Following, based on FIG. 12, the particular geometry of the energy concentrator of this operational version according to FIG. 10 shall be outlined. The prisms 14 show a prism height H measured in radial direction and a prism side L where these dimensions are in a particular relationship to one another as well as to the outer diameter d=2R (2×radius R) and H is to L and to d as 1 to approximately 2 and approximately 100. Especially advantageous for the magnitude of the concentration factor is the ratio H:L:d= 1:1.98:100.83.

In regard to the design of the lens element 84, B is the width of the lens element, $R_y$ the radius of the curvature of the concave lens surface 88 and $R_x$ the radius of the curvature of the convex lens surface 86. In relationship to the prism height, the ratio H:B:$R_y$:$R_x$=1 to approximately 95 to 100 to approximately 60 to 65 to approximately 60 to 62, particularly 1:97:63.33:60.83.

This results in an angular distance y of the individual prisms 14 from each other of approximately 2° (see FIG. 11).

In an actual operational version the mounting ribs 94 according to FIG. 11 show a height h of approximately 3 mm, a width v of approximately 1.5 mm and an angular distance $\alpha_x$ (FIG. 10) from each other of approximately 60° so that the lens element 84 preferably extends over this circumferential area $\alpha_x$. This results in a lens width B of approximately 55 to 60 mm, particularly 58.2 mm. The radius $R_y$ is approximately 38 mm and $R_x$ approximately equals 36.5 mm. The greatest thickness of the lens element 84 is approximately 2 mm in radial direction of the energy concentrator 6. The thickness a of the energy concentrator 6 in the prism-free areas is approximately 2 mm.

In a particularly advantageous operational version of the invention it is proposed that the prism structure 12 or the two prism zones 80 extend in both circumferential directions along a semi-circle of 180° and that with extension sections 96 of, e.g., approximately 30°. This is insofar advantageous as during the installation the solar collector 2 or the energy concentrator 6, respectively, with its lens element 84 can be aligned by turning it around its longitudinal axis into optimal position toward the course of the sun, which varies of course depending on the geographical location; in any case, the lateral end sections of the "upper semi-circle" feature prisms 14. This means that the energy concentrator 6 based on the middle position shown in FIG. 10 can be rotated in both directions at least as far as the scope of the angle of the extension section 96. This is especially significant in case of a multiple arrangement of several parallel solar collectors 2 (cf. FIGS. 7 and 8) since these can be installed in individually different rotation positions adapted to the course of the sun thus optimally utilizing the energy of the sun or also assuring optimal energy distribution, respectively, throughout the day without requiring different operational versions. Much more, a uniformly designed energy concentrator 6 can be manufactured and utilized for all different positions. This is, of course, particularly economical.

The invention is not limited to the operational examples shown and described but also encompasses all operational versions working in the sense of the invention.

We claim:

1. Device for winning thermal and/or electric energy from sunlight with at least one solar collector (2) exhibiting an absorber (4) featuring along the absorber's (4) entire length and circumferentially enclosing—at least sectionally—an energy concentrator (6) that focuses the sunlight optically upon the absorber (4) characterized by the fact that the energy concentrator (6) features, at least in a circumferential area, a prism structure (12) consisting of a transparent material exposed to sunlight according to the daily course of the sun where these prisms (14) with a multiplicity of axially and parallel to the absorber (4) arranged prisms (14) are placed side by side on the periphery where all prisms (14) have an isosceles and identical cross-section with their tips (18) pointing to the absorber (4) where the prisms (14) with their tips or "diffracting edges" (18) are arranged to point to the absorber (4) where an axis (19) running through each tip (18) and dividing a prism angle (β) half run essentially radially to the central axis of the solar collector (2) and where the prisms (14) are formed with convex curved outer surfaces (20) on the sides exposed to the sunlight where the outer surfaces (20) of the prisms (14) are formed by a continuously convex and, in its cross-section, circular arc-shaped outer surface (22) of the energy concentrator (6) where because of the geometry of the prisms (14) surface focusing of the sunlight is achieved in such a manner that one focusing area lies during the course of the sun at least partially in an area that covers the range of the absorber (4).

2. Device according to claim 1, characterized by the fact that the energy concentrator (6) has a tubular shape enveloping the absorber (4) coaxially.

3. Device according to claim 1, characterized by the fact that the prism structure (12) extends essentially along the entire circumference of the energy concentrator (6).

4. Device according to claim 1, characterized by the fact that the prism structure (12) extends only along an essentially semi-tubular partial section of the circumference of the energy concentrator (6).

5. Device according to claim 4, characterized by the fact that the remaining partial sector of the tubular circumference of the energy concentrator (6) lying outside the prism structure (12) is formed either as a tubular shell (24) joined in one piece to the prism structure (12) or else joins the prism structure (12) with linking elements to a housing part.

6. Device according to claim 1, characterized by the fact that in the area of the prism structure (12) preferably at least one prism-free lens zone (82) with an elongated in its cross-section convex/concave formed lens element (84) running parallel to the prisms (14) is fashioned in such a manner that light rays running transversely at a secants-like course (92) caused by deflection by the prisms (14) hit the lens element (84) and are deflected by it unto the absorber (4).

7. Device according to claim 1, characterized by the fact that the prism structure (12) in the area of the prisms (14) is formed from a flexible originally plane film or foil material (30) featuring a plane surface (28) on one side and the prisms (14) on the other by shaping this material (30) into a cylindrical or cylinder segment form.

8. Device according to claim 1, characterized by the fact that the energy concentrator (6) manufactured as extrusion part of crystal-clear plastic where preferably the lens element (84) is manufactured as a separate part and joined with the remaining part in either positive and/or non-positive or/and bonded fashion.

9. Device according to claim 1, characterized by the fact that the material (30) forming the prism structure (12) shows a thickness (D)—measured from the outer surface (28) to the tips (18)—of at least 0.5 mm, preferably though, in the range of approximately 1.5 to 2 mm in the area of the prisms (14).

10. Device according to claim 1, characterized by the fact that the prisms (14) starting at a base (32) show a radially measured height (H) relating to the prism side length (L) and to the outer diameter (d) of the energy concentrator (6) as 1: approximately 2: approximately 100, in particular as 1:1.98:100.83.

11. Device according to claim 6, characterized by the fact that the prism height (H) relates to the width (B) of the lens element (84) and to the curvature radius ($R_v$) of the concave lens surface (88) and to the curvature radius ($R_x$) of the convex lens surface (86) as 1: approximately 100: approximately 63: approximately 60 to 61, in particular as 1:97:63.33:60.83.

12. Device according to claim 1, characterized by the fact that the prisms (14) originating from a base (32) show a height (H) approximately in the range from 0.15 to 0.8 mm, in particular of 0.6 mm.

13. Device according to claim 1, characterized by the fact that the adjoining prisms (14) show a lateral center distance (A) from each other lying approximately in the range of 0.3 to 0.5 mm or in the range of an angular distance of approximately 2°.

14. Device according to claim 1, characterized by the fact that the adjoining prism surfaces (34, 36) of two adjoining prisms (14) include an angle ($\alpha'$) that is smaller/equal 90° or greater/equal 90°.

15. Device according to claim 1, characterized by the fact that the absorber (4) is tubular allowing a heat transport medium to flow through it.

16. Device according to one or several of the claims 1 through 15, characterized by the fact that the absorber (4) features photovoltaic elements (8) on the outside.

17. Device according to claim 1, characterized by the fact that a reflector (38) is positioned on the side of the absorber (4) that faces away from the sunlight.

18. Device according to claim 1, characterized by the fact that the space (42) between the absorber (4) and the optical energy concentrator (6) is or can be evacuated.

19. Device according to claim 16, characterized by the fact that a vacuum pump is at least partially powered by the photovoltaic elements 8.

20. Device according to claim 1, characterized by the fact that the absorber (4) features outer fins (44) to enlarge its energy absorbing surface.

21. Device according to claim 15, characterized by the fact that the tubular absorber (4) features inside fins (46) to enlarge its inner surface remitting energy to the heat transport medium.

22. Device according to claim 1, characterized by the fact that the absorber (4) features a corrugated tube wall created by the known denting process with special radially inward pointing bead-shaped surface zones distributed across the wall of the tube.

23. Device according to claim 1, characterized by the fact that the solar collector (2) features a mounting element (50) on each side where, preferably, the mounting elements (50) also position the inner absorber (4) as well as the outer energy concentrator (6) and, if applicable, the reflector (38).

24. Device according to claim 23, characterized by the fact that each mounting element (50) tightly encloses the ends of the tubular energy concentrator (6) with a special elastic sealing element (52).

25. Device according to claim 23, characterized by the fact that each mounting element (50) features at least one connector (70) transitioning into the tubular absorber (4) for the connection with a connecting line (71) for the heat transport medium.

26. Device according to claim 1, characterized by the fact that the absorber (4) is made of aluminum.

27. Device according to claim 15, characterized by the fact that the heat transport medium is enriched with metal and, particularly, copper particles and yet inhibited in such a way that an electrical connection to the absorber (4) is avoided.

28. Device according to claim 1, characterized by the fact that the energy concentrator (6) features an outer transparent and contamination-repelling coating, at least in the area of the prism structure (12) and, if applicable, of its lens element (84) consisting of minute ceramic particles.

29. Utilization of a tubular absorber according to claim 22 as heat exchange pipe of a general kind for heating and/or cooling purposes.

* * * * *

UNITED STATES PATENT AND TRADEMARK OFFICE
CERTIFICATE OF CORRECTION

PATENT NO. : 5,727,585
DATED : March 17, 1998
INVENTOR(S) : Daume et al.

It is certified that error appears in the above-indentified patent and that said Letters Patent is hereby corrected as shown below:

Column 2, line 58, "pads" should read --parts--.

Column 4, line 18, "min" should read --mm--.

Column 8, Claim 1, line 51, after "(β)" insert --in--.

Signed and Sealed this

Second Day of June, 1998

BRUCE LEHMAN

Attest:

Attesting Officer        Commissioner of Patents and Trademarks